(No Model.)
R. R. GWATHMEY.
COTTON GIN.
No. 278,134.
2 Sheets—Sheet 1.
Patented May 22, 1883.
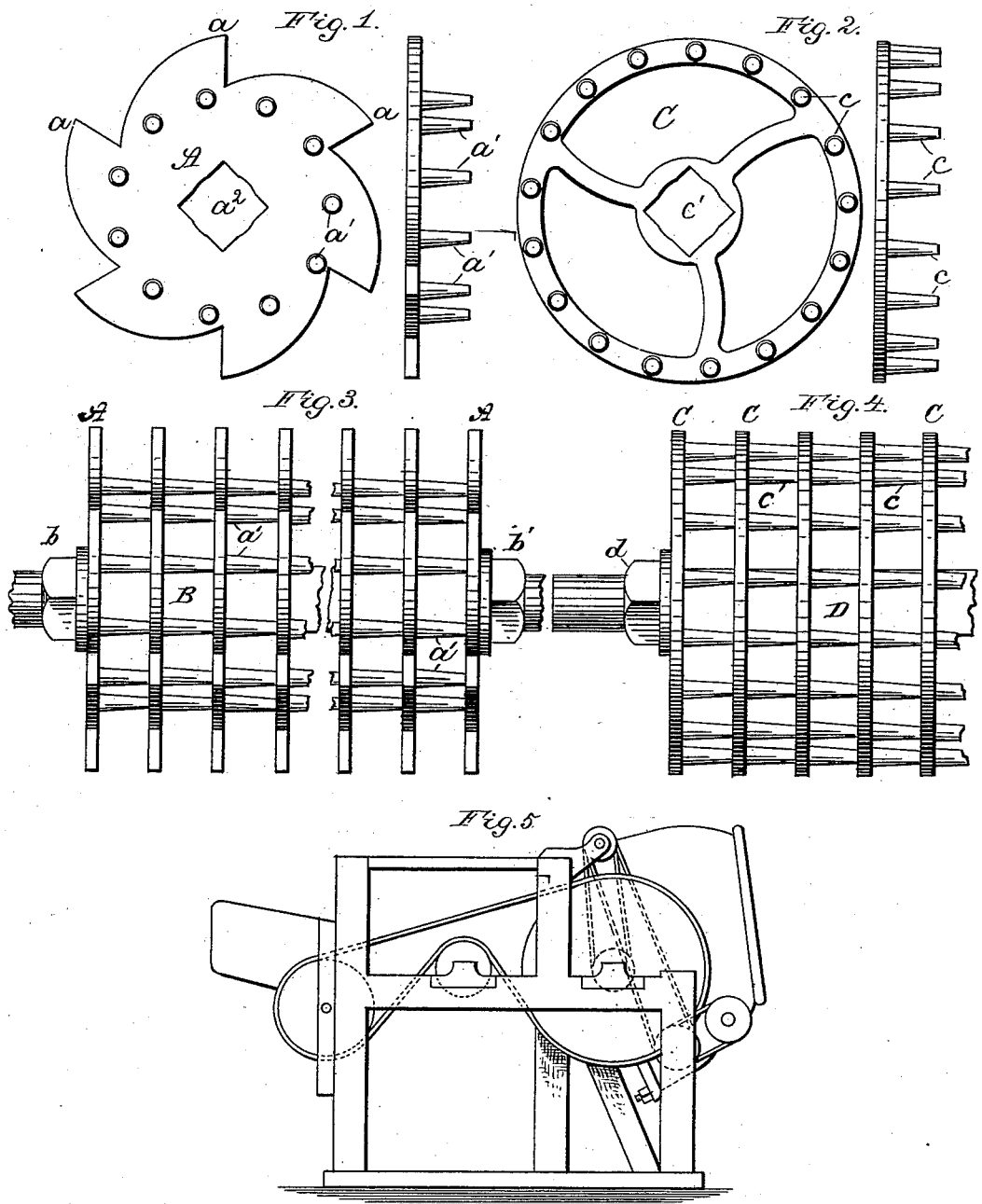
Witnesses:
J. W. Garner
W. S. D. Haines
Inventor:
R. R. Gwathmey
per H. J. Ennis
Atty.

(No Model.) 2 Sheets—Sheet 2.

R. R. GWATHMEY.
COTTON GIN.

No. 278,134. Patented May 22, 1883.

Witnesses:
J. W. Garner
H. S. D. Haines

Inventor:
R. R. Gwathmey
per H. J. Ennis
Atty.

United States Patent Office.

RICHARD R. GWATHMEY, OF MEMPHIS, TENNESSEE.

COTTON-GIN.

SPECIFICATION forming part of Letters Patent No. 278,134, dated May 22, 1883.

Application filed October 20, 1882. (No model.)

*To all whom it may concern:*

Be it known that I, RICHARD R. GWATHMEY, a citizen of the United States, residing at Memphis, in the county of Shelby and State of Tennessee, have invented certain new and useful Improvements in Cotton-Gins, of which the following is a specification, reference being had therein to the accompanying drawings.

My invention has relation to cotton-gins, and more particularly to the construction of the feed-rolls placed in the bottom of the feed-box, whereby the hulls, dirt, and trash are separated and removed from the seed cotton; and the object of the invention is to so construct these feed-rollers that the foreign matter will be more rapidly and effectually removed than heretofore.

To this end the invention consists in the novel construction of said rollers, as will be hereinafter more fully set forth and claimed.

In the accompanying drawings similar letters of reference indicate like parts of the invention.

Figure 6:
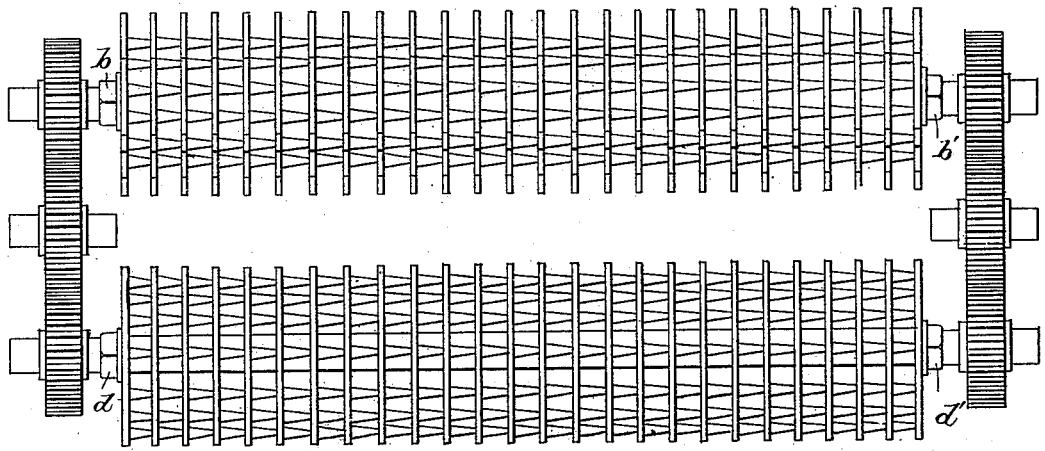
Figure 7:
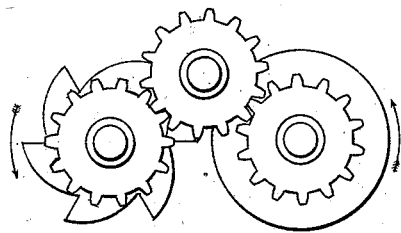
Figure 8:
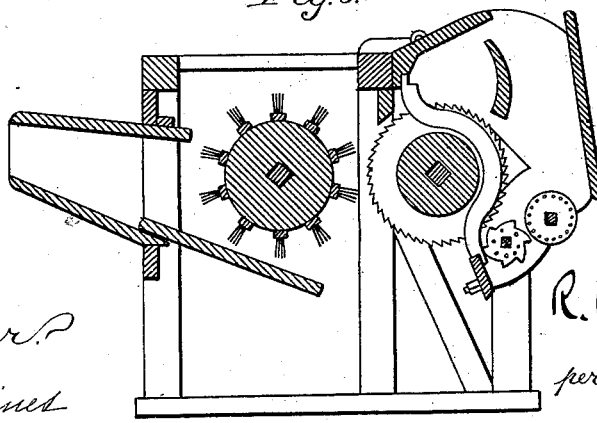

Figure 1 is a plan and edge view of one of the sections of the inner roll; Fig. 2, a plan and edge view of one of the sections of the outer roll; Fig. 3, a side view of the inner roll; Fig. 4, a similar view of the outer roll; Fig. 5, a side view of a gin with the rolls in position; Fig. 6, a plan view of the rolls detached from the gin; Fig. 7, an end view of the rolls; and Fig. 8, a longitudinal section of a cotton-gin, showing the relative position of the rolls in the gin.

A is a cast-iron disk, having serrations $a$ on its periphery, and provided on one side with lateral projections $a'$. In the center of this disk is a square hole, $a^2$, for the insertion of the shaft B. It will thus be seen that a series of these disks A may be mounted on the shaft B, the projections $a'$ separating each section, so as to form a hollow or open roll, the nuts $b$ $b'$ on the shaft serving to clamp the sections firmly together and make a practically rigid roll.

The sections C of the outer roll have projections $c$, and a square central hole, $c'$, for shaft D, so that a number of the sections may be placed on said shaft and secured in place by the nuts $d$ $d'$, as shown in Figs. 4 and 6.

The serrations $a$ on the disks A carry the bolls or pods forward to the saws and insure the proper supply of feed. As both rolls revolve inwardly to the saws the cotton is carried from the outer roll to the inner one, where it drops into the spaces formed by the serrations, and is thus regularly and positively fed to the saws. Both of these feed-rollers are formed of sections, and may be made longer or shorter by increasing or diminishing the length of their respective shafts and supplying or removing the sections in proportion.

I make no claim to the construction of the gin proper.

Having thus fully described my invention, what I claim is—

1. In a cotton-gin, a feed-roll formed of a series of disk-sections, A, having lateral projections $a'$, and secured upon the shaft B, as set forth.

2. In a cotton-gin, a feed-roll formed of a series of sections, A, having serrations $a$ for carrying the cotton to the gin-saws, as set forth.

3. In a cotton-gin, a feed-roll formed of a series of sections, C, having projections $c$, and mounted on the shaft D, forming an open or hollow roll, to allow the foreign matter to pass through, as set forth.

4. The combination, in a cotton-gin, of the feed-roll formed of the sections A, having serrations $a$ and projections $a'$, with the feed-roll formed of a series of sections, C, having projections $c$, said rolls being adapted to feed the seed cotton to the saws, and at the same time allow the foreign matter to pass through them, as set forth.

In testimony whereof I affix my signature in presence of two witnesses.

RICHARD R. GWATHMEY.

Witnesses:
E. H. BRADFORD,
H. J. ENNIS.